United States Patent
Dietz et al.

(10) Patent No.: US 11,278,975 B2
(45) Date of Patent: Mar. 22, 2022

(54) CUTTING TOOL

(71) Applicant: MILWAUKEE ELECTRIC TOOL CORPORATION, Brookfield, WI (US)

(72) Inventors: Carl Dietz, Menomonee Falls, WI (US); Shane N. Felton, Colgate, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 15/981,481

(22) Filed: May 16, 2018

(65) Prior Publication Data

US 2018/0333794 A1 Nov. 22, 2018

Related U.S. Application Data

(60) Provisional application No. 62/508,112, filed on May 18, 2017.

(51) Int. Cl.
*B23D 61/12* (2006.01)
*B28D 1/12* (2006.01)

(52) U.S. Cl.
CPC ......... *B23D 61/121* (2013.01); *B23D 61/123* (2013.01); *B23D 61/127* (2013.01); *B23D 61/128* (2013.01); *B28D 1/127* (2013.01)

(58) Field of Classification Search
CPC ..... B24D 5/123; B23D 61/121; B23D 61/123
USPC ...................................................... 451/70, 54
See application file for complete search history.

(56) References Cited

U.S. PATENT DOCUMENTS

| | | | | |
|---|---|---|---|---|
| 118,800 | A * | 9/1871 | Green | B23D 61/123 |
| | | | | 83/837 |
| 3,831,236 | A * | 8/1974 | Coburn | B23C 5/18 |
| | | | | 407/53 |
| 3,866,504 | A * | 2/1975 | Claesson | B27B 33/02 |
| | | | | 83/852 |
| 5,052,153 | A * | 10/1991 | Wiand | B24B 13/01 |
| | | | | 451/70 |
| 5,092,083 | A * | 3/1992 | Raffaelli | B24B 13/01 |
| | | | | 407/40 |
| 5,529,528 | A * | 6/1996 | Young | B23D 61/026 |
| | | | | 451/28 |
| 5,725,416 | A * | 3/1998 | Russell | B24D 5/06 |
| | | | | 241/293 |
| 6,632,131 | B1 * | 10/2003 | Buchholz | B23D 61/026 |
| | | | | 125/13.01 |
| 6,945,850 | B2 * | 9/2005 | Perrey | B23D 61/026 |
| | | | | 125/13.01 |
| 7,055,515 | B2 * | 6/2006 | Bishop | B23D 61/026 |
| | | | | 125/13.01 |
| 9,676,044 | B2 * | 6/2017 | Eisen | B23D 61/025 |
| 2003/0029297 | A1 * | 2/2003 | Haughton | B23D 61/04 |
| | | | | 83/853 |

FOREIGN PATENT DOCUMENTS

JP         06079522 A  *  3/1994  ............ B23D 61/14

* cited by examiner

*Primary Examiner* — Kenneth E Peterson
(74) *Attorney, Agent, or Firm* — Michael Best & Friedrich LLP

(57) ABSTRACT

A saw blade includes a body and a cutting portion coupled to an edge of the body. The cutting portion includes a plurality of cutting teeth. The plurality of cutting teeth includes a first tooth form with an abrasive grit and a second tooth form without an abrasive grit.

15 Claims, 4 Drawing Sheets

CUTTING TOOL

CROSS REFERENCE TO RELATED APPLICATIONS

This application claims priority to U.S. Provisional Patent Application No. 62/508,112, filed May 18, 2017, the entire contents of which are incorporated herein by reference.

BACKGROUND

The present invention relates to a cutting tool having a blade, for example, for use as a linear edge blade formed for a band saw, jigsaw, hacksaw, handsaw, reciprocating saw, or hole saw.

Cutting tools generally have cutting teeth that are used for cutting or edging workpieces such as wood, tile, brick, concrete or the like. Typical cutting tools could include band saw, jigsaws, hacksaws, reciprocating saws, or hole saws. Unfortunately, cutting teeth on cutting tools do not leave clean kerfs when passing through workpieces.

SUMMARY

In one embodiment, the invention provides a saw blade including a body and a cutting portion coupled to an edge of the body. The cutting portion includes a plurality of cutting teeth. The plurality of cutting teeth includes a first tooth form with an abrasive grit and a second tooth form without an abrasive grit.

In another embodiment, the invention provides a saw blade including a body and a cutting portion coupled to an edge of the body. The cutting portion includes a plurality of cutting teeth. The plurality of cutting teeth includes a first tooth form with an abrasive grit and a second tooth form having a tip, a rake face extending from the tip and generally perpendicular to the edge of the body, and a relief surface extending from the tip and sloped relative to the edge of the body.

In another embodiment, the invention provides a reciprocating saw blade for use with a reciprocating saw. The reciprocating saw blade includes a body defining a longitudinal axis and an attachment portion coupled to the body and configured to attach to the reciprocating saw. The attachment portion includes a tang and an aperture. The reciprocating saw further includes a cutting portion coupled to an edge of the body. The cutting portion includes a plurality of cutting teeth. The plurality of cutting teeth includes a plurality of first tooth forms with abrasive grits and a plurality of second tooth forms without abrasive grits. The first tooth forms and the second tooth forms are arranged in a repeating pattern along a length of the body.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
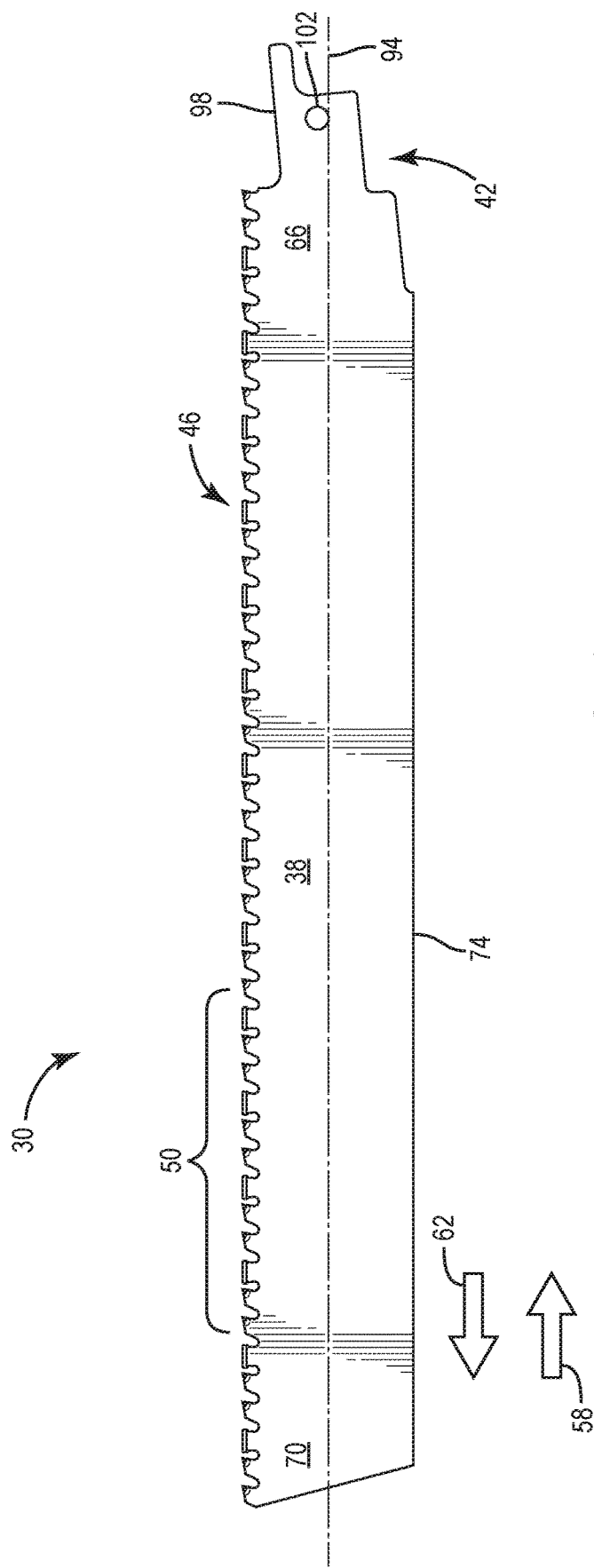
FIG. 1 is a side view of a saw blade according to one embodiment of the present invention.
Figure 2:
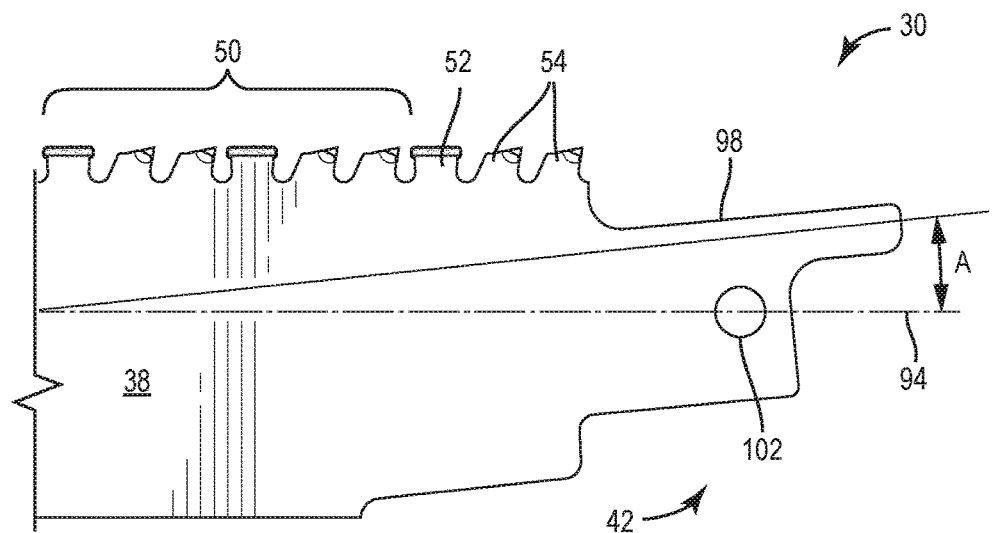
FIG. 2 is an enlarged view of a portion of the saw blade shown in FIG. 1.
Figure 3:
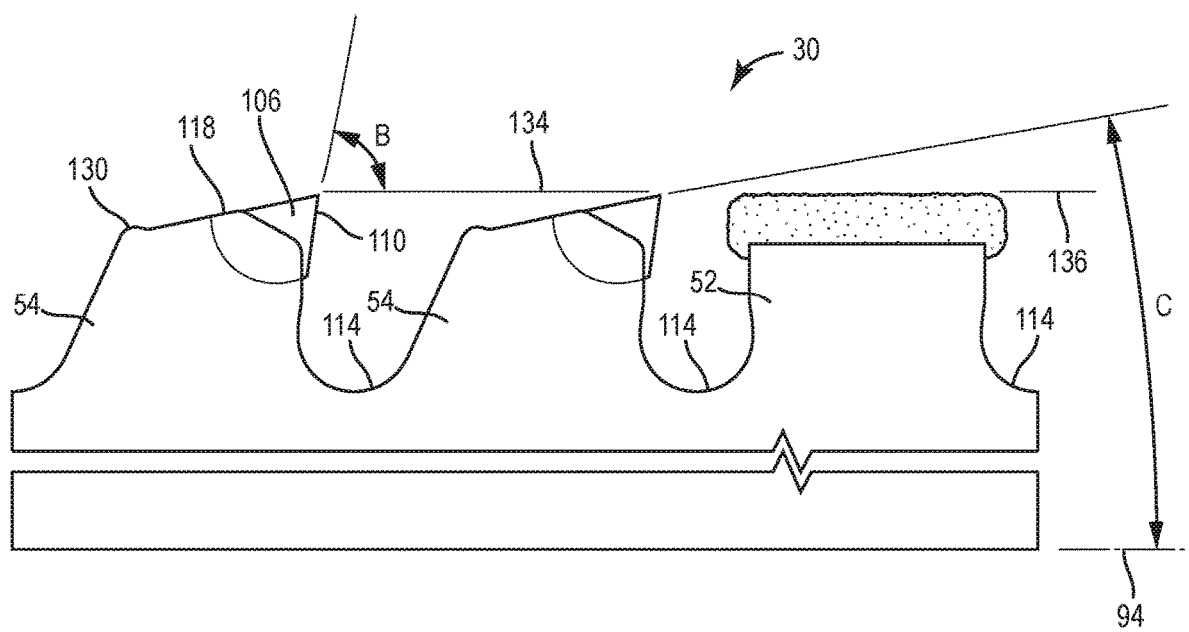
FIG. 3 is an enlarged view of another portion of the saw blade shown in FIG. 1.

FIGS. 1-3 illustrate a saw blade 30 according to one embodiment of the invention. The illustrated saw blade 30 is a reciprocating saw blade for use with a power tool such as, for example, a reciprocating saw. With reference to FIG. 1, the saw blade 30 includes a body 38, an attachment portion 42 for coupling the blade 30 to the reciprocating saw, and a cutting portion 46 having a plurality of cutting teeth 50 coupled to a side or edge of the body 38. In the illustrated embodiment, the body 38, the attachment portion 42, and the cutting portion 46 are all integrally formed as a single piece such that the saw blade 30 is a unitary structure. In other embodiments, the saw blade 30 may be formed from several pieces that are welded or otherwise secured together. During operation, the saw blade 30 is reciprocated in a cutting direction 58 and a return direction 62 to cut through a work piece. In some embodiments, the saw and the blade 30 may be used to cut through metal work pieces such as stainless steel, or metal embedded work pieces. Additionally, the saw and the blade 30 may be beneficial for concrete or masonry materials as well.

The body 38 includes a first end portion 66 and a second end portion 70. The attachment portion 42 is coupled to (e.g., formed at) the first end portion 66 of the body 38. The second end portion 70 of the body 38 is located opposite the first end portion 66. A back portion 74 extends between the first end portion 66 and the second end portion 70 on a side or edge of the body 38 opposite the cutting portion 46. The illustrated back portion 74 can include stepped surfaces at different distances from the cutting portion 46. The body 38 also defines a longitudinal axis 94 extending through the first end portion 66 and the second end portion 70.

The attachment portion 42 extends from the first end portion 66 of the body 38 and includes a tang 98 and an aperture 102. The tang 98 and the aperture 102 are configured to engage a blade clamp of a reciprocating saw to securely and releasably couple the blade 30 to the saw. As shown in FIG. 2, the illustrated attachment portion 42 is angled relative to the longitudinal axis 94 by a tang angle A. The tang angle A is measured between the longitudinal axis 94 and an axis extending along the length of the tang 98. In the some embodiments, the tang angle A can be between 3 degrees and 6.5 degrees. In other embodiments, the tang angle A may be larger or smaller.

With continued reference to FIG. 2, the cutting teeth 50 include two different tooth forms 52, 54 on the body 38. The first tooth form 52 is an abrasive grit tooth, wherein the abrasive grit can include, for example, tungsten carbide, diamond, silicon carbide, cubic boron nitride, other abrasive materials and combinations of these materials. As shown in the figures, the first tooth form 52 is a generally rectangularly shaped tooth body with a generally vertical rake face that is perpendicular to the edges of the body and no clearance angle. The abrasive material is applied to the edge of the tooth body positioned along the cutting edge 46. As shown, the first tooth form 52 can have leading and/or trailing portions that extend beyond the rake face.

With reference to FIG. 3, the second tooth form 54 is a more conventional rake type tooth which includes a tip 106, a rake face 110 extending from the tip 106 generally toward the longitudinal axis 94 and at least partially defining a gullet 114, a relief surface 118 extending from the tip 106 and having a first end that is closer to the attachment portion 42 and a second end that is further from the attachment portion 42, and a protrusion 130 extending from the second end of the relief surface 118. The tips 106 of the cutting teeth 54 define a plane 134 that is generally parallel to the longitudinal axis 94. The tips of the second tooth forms 54 define a first plane 134 and the first tooth forms 52 define a second plane 136 that is parallel to the first plane 134. The second plane 136 is defined by the abrasive grit portions of the first tooth forms 52 that do not have a clearance angle (i.e., are parallel to) relative to the longitudinal axis 94 of the body 38. In some embodiments, the second plane 136 is offset from the first plane 134. In other embodiments, the first plane 134 and the second plane 136 are co-planar.

Figure 4:
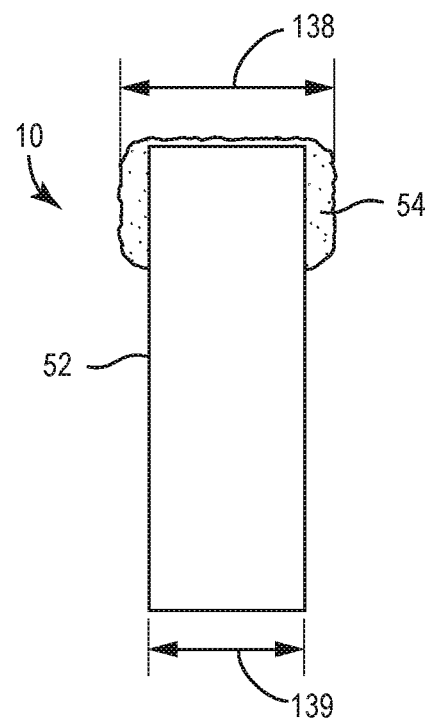
FIG. 4 is an end view of a first tooth form of the saw blade shown in FIG. 1.

As illustrated in FIG. 4, the two tooth forms 52, 54 each have a width or kerf. The widths or kerfs are measured perpendicular to the longitudinal axis 94 of the body 38. A width 138 of the abrasive grit teeth 52 is greater than a width 139 of the rake teeth 54. In other embodiments, the two tooth forms can have similar width or kerfs (e.g., depending upon whether the rake teeth are set).

With further reference to the second tooth form 54, these teeth are illustrated as having solid hard metal tips, such as carbide tips or other relatively hard materials. However, in some embodiments, the second tooth form 54 does not include the solid carbide tip on one or more teeth. For example, the carbide can be eliminated from all teeth or only on some teeth.

As shown in the FIG. 2, the first and second tooth forms 52, 54 are arranged in a repeating pattern along a length of the body 38. More particularly, the first and second tooth forms 52, 54 are arranged in a 1:2 repeating pattern. As illustrated, the pattern is first tooth-second tooth-second tooth (i.e., 52-54-54) repeating pattern. However, as discussed in more detail below, depending upon the application, other patterns could be desired, such as 52-54-52-54; 52-52-54; 52-52-54-54; and the like.

Now referencing FIG. 3, each rake face 110 of the second tooth form 54 extends from the corresponding tip 106 at a rake angle B relative to longitudinal axis 94 (or plane 134). The rake angle B of each cutting tooth 50, measured through the corresponding cutting tooth 50, is preferably a positive rake angle (i.e., less than 90 degrees). In the illustrated embodiment, the rake angle B of each cutting tooth is approximately 85 to 90 degrees. In other embodiments, the rake angle B may be larger or smaller, or each rake face 110 may extend at a 'negative rake angle' (i.e., greater than 90 degrees relative to the plane 134).

The relief surface 118 of each second tooth form 54 extends generally toward the longitudinal axis 94 and is sloped relative to the edge of the body 38. The relief surfaces 118 are oriented at relief angles C relative to the longitudinal axis 94 (or plane 134). In the illustrated embodiment, the relief angle C of each cutting tooth 50 is approximately 10-12 degrees. In other embodiments, the relief angles C may be larger or smaller.

The relief surface 118 of each cutting tooth 50 is interrupted by the protrusion 130 extending from the second end of the relief surface 118. As illustrated, the protrusion 130 of each tooth 54 can include a radius that transitions from the relief surface 118, a first protrusion face that extends from the radius, an apex that extends from the first protrusion face and has a second radius, and a second protrusion face extending from the apex to the gullet 114. In the illustrated embodiment, the apex of each protrusion 130 is curved such that the protrusions 130 are generally rounded. In other embodiments, the protrusions 130 may have other shapes or forms. In yet other embodiments, the protrusion 130 is eliminated.

The protrusions (or material limiter) 130 of the cutting teeth 54 define a plane that is generally parallel to the longitudinal axis 94 and to the plane 134 defined by the tips 106 of the cutting teeth 50. In some embodiments, a distance between the plane 134 defined by the tips 106 and the plane defined by the protrusions 130 is at most approximately 0.035 inches. In the illustrated embodiment, the distance R is approximately 0.032 inches.

The illustrated saw blade 30 includes six teeth per inch (TPI). In other embodiments, the saw blade 30 may include fewer or more teeth per inch. For example, the saw blade 30 may include 5 TPI or up to 10 TPI for applications such as stainless steel. In the illustrated embodiment, the cutting teeth 50 are unset such that the teeth 50 extend straight from the body 38.

Figure 5:
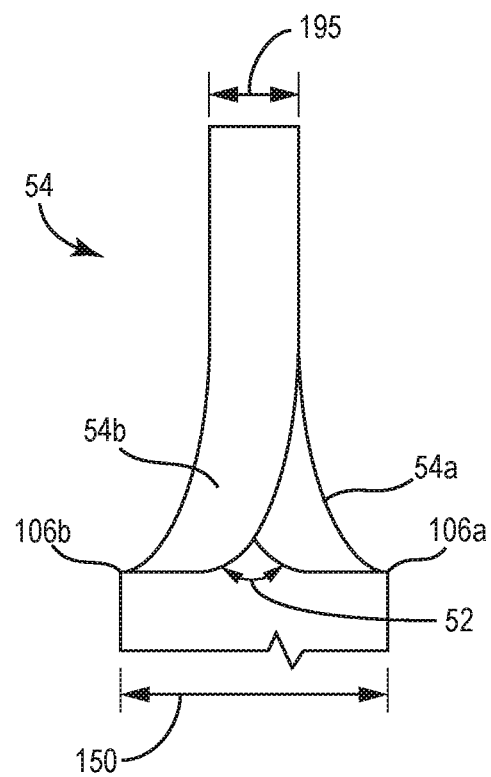
FIG. 5 is an end view of second tooth forms of the saw blade shown in FIG. 1.

As shown in FIG. 5, in some embodiments, the cutting teeth with the second tooth form 54 are bent or "set" at various angles relative to a hypothetical plane defined by the body 38. The first tooth forms 52 are unset, while the second tooth forms 54 are set. A first tooth 54a that is one of the second tooth forms 54 is set one direction relative to the plane of the body 38, and a second tooth 54b that is one of the second tooth forms 54 is set in a direction opposite the first tooth 54b relative to the plane of the body 38. When set, a width 150 between outer tip edges 106a, 106b of the first and second tooth 54a, 54b is greater than a width 195 of the second tooth form 52.

Figure 6:
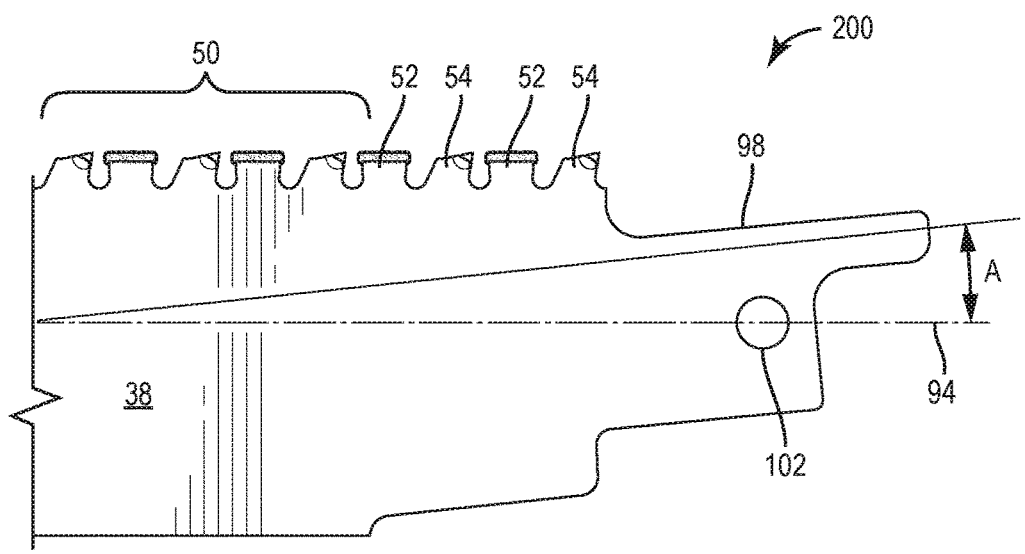
FIG. 6 is a side view of a portion of a saw blade according to another embodiment of the invention.

FIG. 6 illustrates a saw blade 200 according to another embodiment of the invention. The saw blade 200 is similar to the saw blade 30 with like features being represented with like reference numerals. The teeth 50 of the saw blade 200 are arranged in a 1:1 repeating pattern. In other words, as illustrated the pattern is first tooth-second tooth-first tooth-second tooth (i.e., 52-54-52-54).

Figure 7:
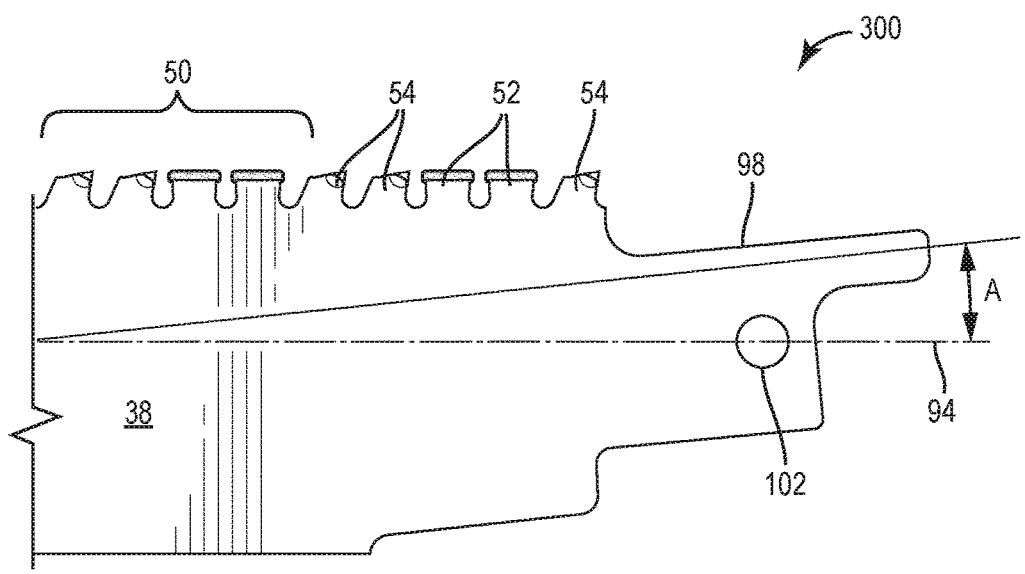
FIG. 7 is a side view of a portion of a saw blade according to another embodiment of the invention.

FIG. 7 illustrates a saw blade 300 according to another embodiment of the invention. The saw blade 300 is similar to the saw blade 30 with like features being represented with like reference numerals. The teeth 50 of the saw blade 300 are arranged in a 2:2 repeating pattern. In other words, as illustrated the pattern is first tooth-first tooth-second tooth-second tooth (i.e., 52-52-54-54).

Figure 8:
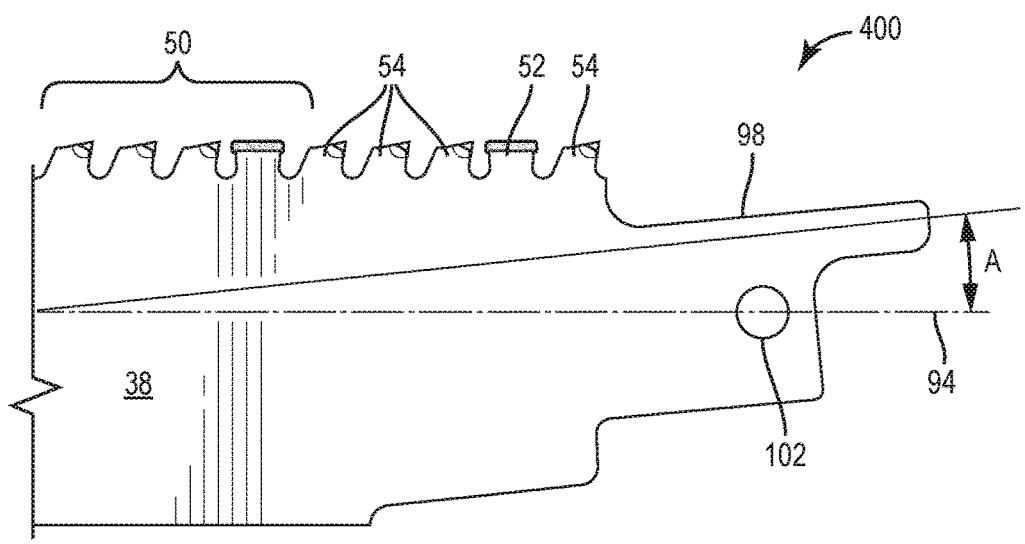
FIG. 8 is a side view of a portion of a saw blade according to another embodiment of the invention.

FIG. 8 illustrates a saw blade 400 according to another embodiment of the invention. The saw blade 400 is similar to the saw blade 30 with like features being represented with like reference numerals. The teeth 50 of the saw blade 400 are arranged in a 1:3 repeating pattern. In other words, as illustrated the pattern is first tooth-second tooth-second tooth-second tooth (i.e., 52-54-54-54).

Although the illustrated embodiment is shown with respect to a reciprocating saw blade, the same cutting teeth can be used on other cutting implements, such as a hole saw, band saw, circular saw, oscillating saw, or the like.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

Various features and advantages of the invention are set forth in the following claims.

What is claimed is:

1. A reciprocating saw blade comprising:
   a body including a body plane; and
   a cutting portion coupled to an edge of the body, the cutting portion including a plurality of cutting teeth defining a linear cutting edge of the saw blade, the plurality of cutting teeth including a plurality of first tooth forms each with an abrasive grit and a plurality of second tooth forms each without an abrasive grit,
   wherein each first tooth form includes a tooth body with a tip having no clearance angle relative to the cutting edge,
   wherein each second tooth form includes a tip and a relief surface extending from the tip, the relief surface being sloped relative to the cutting edge, and
   wherein the plurality of cutting teeth are arranged in a repeating pattern of one or more first tooth forms, followed by one or more second tooth forms, followed by one or more first tooth forms, followed by one or more second tooth forms;
   wherein the abrasive grit on the tips of the first tooth forms define a first plane and the tips of the second tooth forms define a second plane that is co-planar with the first plane; and
   wherein the first plane and the second plane are perpendicular to the body plane.

2. The reciprocating saw blade of claim 1, further comprising an attachment portion coupled to the body and configured to attach to a power tool.

3. The reciprocating saw blade of claim 2, wherein the attachment portion includes a tang and an aperture.

4. The reciprocating saw blade of claim 3, wherein the body defines a longitudinal axis, wherein the attachment portion is coupled to an end portion of the body, and wherein the attachment portion is angled relative to the longitudinal axis.

5. The reciprocating saw blade of claim 1, wherein the abrasive grit includes one selected from the group consisting of tungsten carbide, diamond, silicon carbide, and cubic boron nitride.

6. The reciprocating saw blade of claim 1, wherein the first tooth form includes a rake face that extends from the edge of the body.

7. The reciprocating saw blade of claim 6, wherein a portion of the abrasive grit extends beyond the rake face in a cutting direction of the saw blade.

8. The reciprocating saw blade of claim 1, wherein the second tooth form includes a rake face extending from the tip.

9. The reciprocating saw blade of claim 8, wherein the tip is made out of carbide.

10. The reciprocating saw blade of claim 8, wherein the second tooth form further includes a protrusion extending from an end of the relief surface opposite from the tip.

11. The reciprocating saw blade of claim 1, wherein the first tooth form is immediately adjacent the second tooth form and only separated by a single gullet.

12. The reciprocating saw blade of claim 1, wherein the plurality of first tooth forms is unset, and wherein at least some of the plurality of second tooth forms are set.

13. The reciprocating saw blade of claim 1, wherein the first tooth form has a kerf that is greater than a kerf of the second tooth form.

14. A reciprocating saw blade comprising:
    a body defining a longitudinal axis, the body including a first face and a second face opposite the first face; and
    a cutting portion coupled to an edge of the body, the cutting portion including a plurality of cutting teeth defining a linear cutting edge of the saw blade, the plurality of cutting teeth including
      a first tooth form having a tooth body with no clearance angle relative to the cutting edge and an abrasive grit, and
      a second tooth form having a tip, a rake face extending from the tip and a relief surface extending from the tip and sloped relative to the cutting edge;
    wherein the abrasive grit of the first tooth form and the tip of the second tooth form define a plane that is parallel to the longitudinal axis; and
    wherein the plane is perpendicular to the first and second faces, and wherein the plurality of cutting teeth includes a plurality of first tooth forms each having a tooth body with no clearance angle relative to the cutting edge and an abrasive grit, and a plurality of second tooth forms each having a tip, a rake face extending from the tip, and a relief surface extending from the tip and sloped relative to the cutting edge, and
    wherein the plurality of cutting teeth are arranged in a repeating pattern of one or more first tooth forms, followed by one or more second tooth forms, followed by one or more first tooth forms, followed by one or more second tooth forms.

15. The reciprocating saw blade of claim 14, further comprising an attachment portion coupled to the body and configured to attach to a power tool.

* * * * *